US007076281B2

(12) United States Patent
Kim

(10) Patent No.: US 7,076,281 B2
(45) Date of Patent: Jul. 11, 2006

(54) ANTENNA APPARATUS OF MOBILE COMMUNICATION TERMINAL

(75) Inventor: Jung-Hyo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/944,166

(22) Filed: Sep. 16, 2004

(65) Prior Publication Data

US 2005/0104786 A1 May 19, 2005

(30) Foreign Application Priority Data

Sep. 17, 2003 (KR) ..................... 10-2003-0064488

(51) Int. Cl.
*H04M 1/00* (2006.01)
*H01Q 1/24* (2006.01)

(52) U.S. Cl. ............................... 455/575.7; 455/575.3; 343/702

(58) Field of Classification Search ................ 343/702; 455/575.1, 575.7, 575.5, 90.3, 550.1
See application file for complete search history.

(56) References Cited

U.S. PATENT DOCUMENTS

| | | | | |
|---|---|---|---|---|
| 6,353,733 | B1 * | 3/2002 | Murray et al. | 455/90.1 |
| 2003/0083023 | A1 * | 5/2003 | Chang et al. | 455/90 |
| 2004/0058724 | A1 * | 3/2004 | Choi | 455/575.7 |
| 2004/0224733 | A1 * | 11/2004 | Kim | 455/575.7 |

FOREIGN PATENT DOCUMENTS

| | | |
|---|---|---|
| KR | 20-0308160 | 3/2003 |

* cited by examiner

*Primary Examiner*—Don Wong
*Assistant Examiner*—Angela M Lie
(74) *Attorney, Agent, or Firm*—Lee, Hong, Degerman, Kang & Schmadeka

(57) ABSTRACT

Disclosed is an antenna apparatus for a mobile communication terminal which reduces exposure to a terminal user of electromagnetic radiation emitted from the antenna when the terminal is in use. There is provided a folding type mobile communication terminal comprising a plurality of gears installed in the hinge of the terminal to for varying an angle between the antenna and the terminal body. The angle corresponds to an angle of rotation by the first folding body with respect to the second folding body of the terminal.

10 Claims, 6 Drawing Sheets

ANTENNA APPARATUS OF MOBILE COMMUNICATION TERMINAL

CROSS REFERENCE TO RELATED APPLICATIONS

Pursuant to 35 U.S.C. § 119(a), this application claims the benefit of earlier filing date and right of priority to Korean Application No. 2003-64488, filed on Sep. 17, 2003, the contents of which are hereby incorporated by reference herein in their entirety.

BACKGROUND OF THE INVENTION

1. Field of the Invention

The present invention relates to a mobile communication terminal, and more particularly, to an antenna apparatus for reducing user exposure to electromagnetic radiation generated from the mobile communication terminal.

2. Description of the Related Art

As mobile communication terminals become more popular and are widely being used, increased exposure to electromagnetic waves generated from mobile communication terminals is becoming more prevalent. Accordingly, various studies and measurements have been performed, wherein a specific absorption ratio (SAR), which indicates an amount of electromagnetic radiation generated from mobile communication terminals and absorbed by humans, has been defined. This value is currently being used to regulate electromagnetic wave emissions when manufacturing production mobile communication terminals as well as in the development of new terminals such as IMT-2000 terminals, personal digital assistants (PDA's), and the like.

In some countries, there are standards that regulate the amount of electromagnetic waves generated from mobile terminals to specific levels, and only those mobile terminals that meet this standard may be sold to consumers. Therefore, efforts and research for reducing the exposure to electromagnetic radiation are actively being performed.

FIG. 1 is a perspective view showing the construction of a mobile communication terminal according to the related art. As shown, the mobile terminal comprises: a first folding body 10; a second folding body 22 rotatively connected to the first folding body 10 via a hinge portion 30; and an antenna device 40 protruding away from an upper surface 15*b* of the body 10.

The first folding body 10 includes: a body case 15 covering a main PCB; a battery 12 mounted at a rear surface of the body case 15; and a camera 18 mounted at a front upper end portion of the body case 15. The second folding body 22 includes: a secondary liquid crystal screen 21 formed on the front surface of the second folding body 22; and a sound wave transmission hole 23 formed at a lower end portion of the front surface of the second folding body 22.

The antenna device 40 is composed of a helical antenna and a whip antenna. As shown in FIG. 2, the helical antenna includes: a bobbin 42 wound by a helical wire 42*a* in a hollow cylindrical antenna body 41; and a fitting unit 44 for connection to the main PCB of the body 10 and provided with a screw 43. The whip antenna includes: a whip 45 provided with a signal transmitting wire therein; a knob 47 formed at the end of the whip 45; and a stopper 46 for preventing the whip 45 from being completely separated from the body 10. As shown in FIG. 3, the screw 43 is coupled to a bushing 15*a* of a conductive material mounted in the rear of the body case 15.

An operation of the related art antenna apparatus of the mobile terminal will be explained as follows. When the mobile communication terminal is in a call standby state, generally the whip antenna 45 is recessed and only the helical antenna of the antenna device 40 is used. If a user extracts the whip 45, such as by pulling on the knob 47 when making or receiving a call, the helical antenna is not used and, instead, only the whip antenna is used. Herein, the whip 45 is extracted until the stopper 46 comes into contact with the fitting unit 44. The signal transmitting wire mounted in the whip 45 transfers the received signals to the main PCB of the body 10 to thereby enable mobile communications.

However, the related art antenna device 40 fixed to the terminal body remains proximate to the user's person, generally the head, when the mobile communication terminal is in use. Since electromagnetic waves generated from the antenna device 40 are emitted in a direction perpendicular to the antenna device 40, electromagnetic waves from the related art antenna device 40 are emitted towards the user.

SUMMARY OF THE INVENTION

Accordingly, the present invention is directed to a mobile communication terminal with an antenna apparatus that substantially obviates one or more problems due to limitations and disadvantages of the related art above.

An object of the present invention is to provide an antenna apparatus for reducing user exposure to electromagnetic radiation generated from the mobile communication terminal.

Another object of the present invention is to provide an antenna apparatus for a folding-type mobile communication terminal wherein an angle of incidence may be maintained with respect to the open/close state of the terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a mobile communication terminal comprising: a first folding body rotatively connected to a second folding body via a hinge; an antenna removably fixed to the first folding body; and a mechanism for varying an angle between the antenna and the first folding body, wherein the angle corresponds to an angle of rotation by the first folding body with respect to the second folding body.

According to one aspect of the present invention, the mechanism may comprise a hinge gear disposed in the hinge, wherein rotation of the first folding body with respect to the second folding body results in rotation of the hinge gear; a connection gear in operational relationship the hinge gear so that rotation of the hinge gear in a direction results in rotation of the connection in the opposite direction; an antenna gear operatively in operational relationship with the connection gear so that rotation of the hinge gear in a direction results in rotation of the connection in the opposite direction; and an antenna fixing unit fixed to the antenna gear so that rotation of the antenna gear results in rotation of the antenna fixing unit through a predetermined angle.

According to another aspect of the present invention, the angle between the antenna and the first folding body is approximately 180° when the angle of rotation by the first folding body with respect to the second folding body is approximately 0°. Also, the angle between the antenna and the first folding body is minimized when the angle of rotation by the first folding body with respect to the second folding body is maximized.

It is to be understood that both the foregoing general description and the following detailed description are exemplary and explanatory and are intended to further describe the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will now be made in detail to the preferred embodiments of the present invention, examples of which are illustrated in the accompanying drawings.

Figure 1:
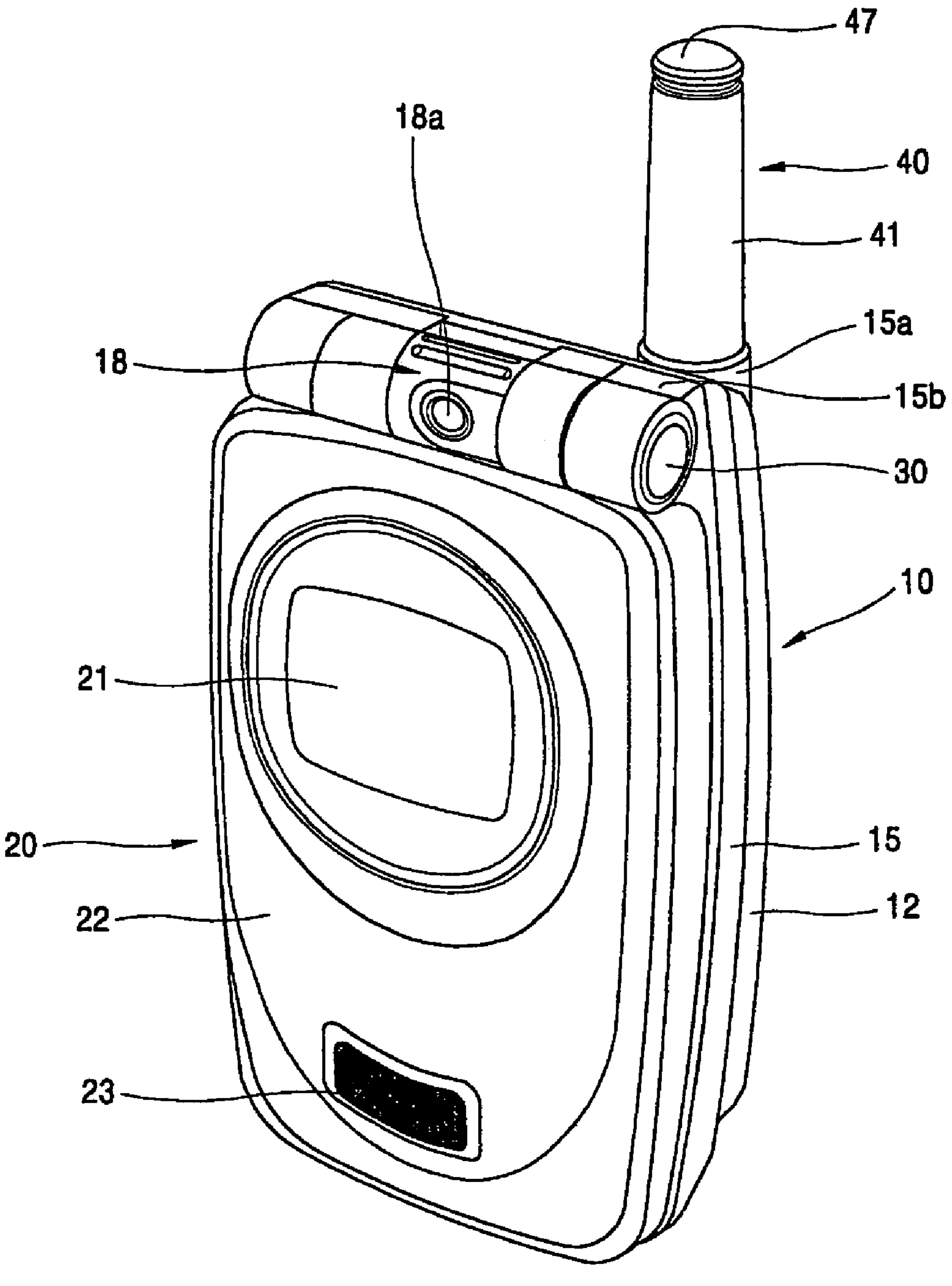
FIG. 1 BACKGROUND ART
FIG. 1 illustrates a perspective view of a mobile communication terminal in accordance with the related art.
Figure 2:
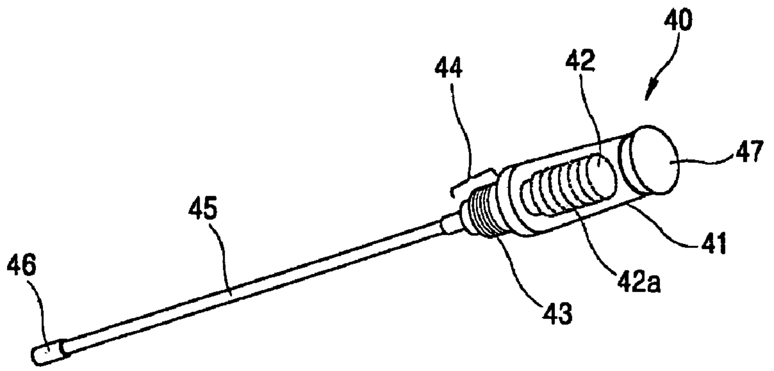
FIG. 2 BACKGROUND ART
FIG. 2 illustrates a perspective view of an antenna provided in the mobile communication terminal of FIG. 1.
Figure 3:
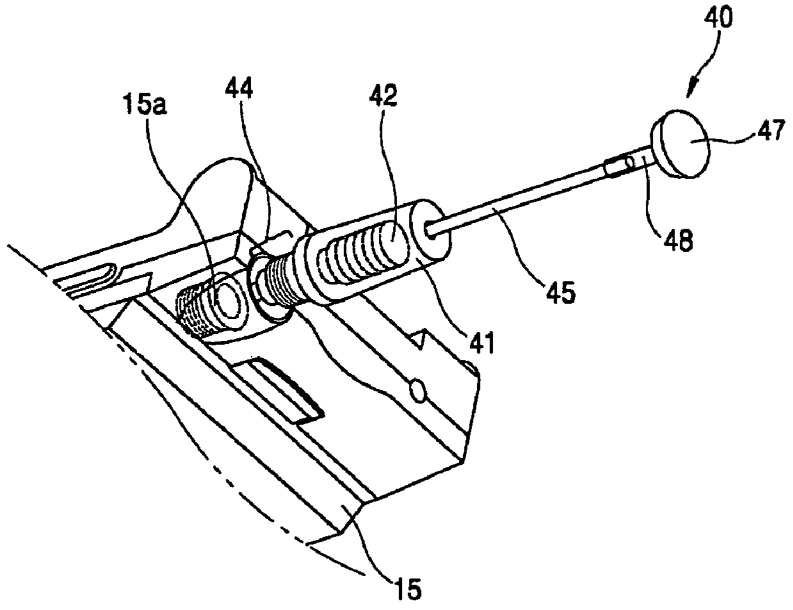
FIG. 3 BACKGROUND ART
FIG. 3 illustrates a perspective view an extracted antenna provided in the mobile communication terminal of FIG. 1.
Figure 4:
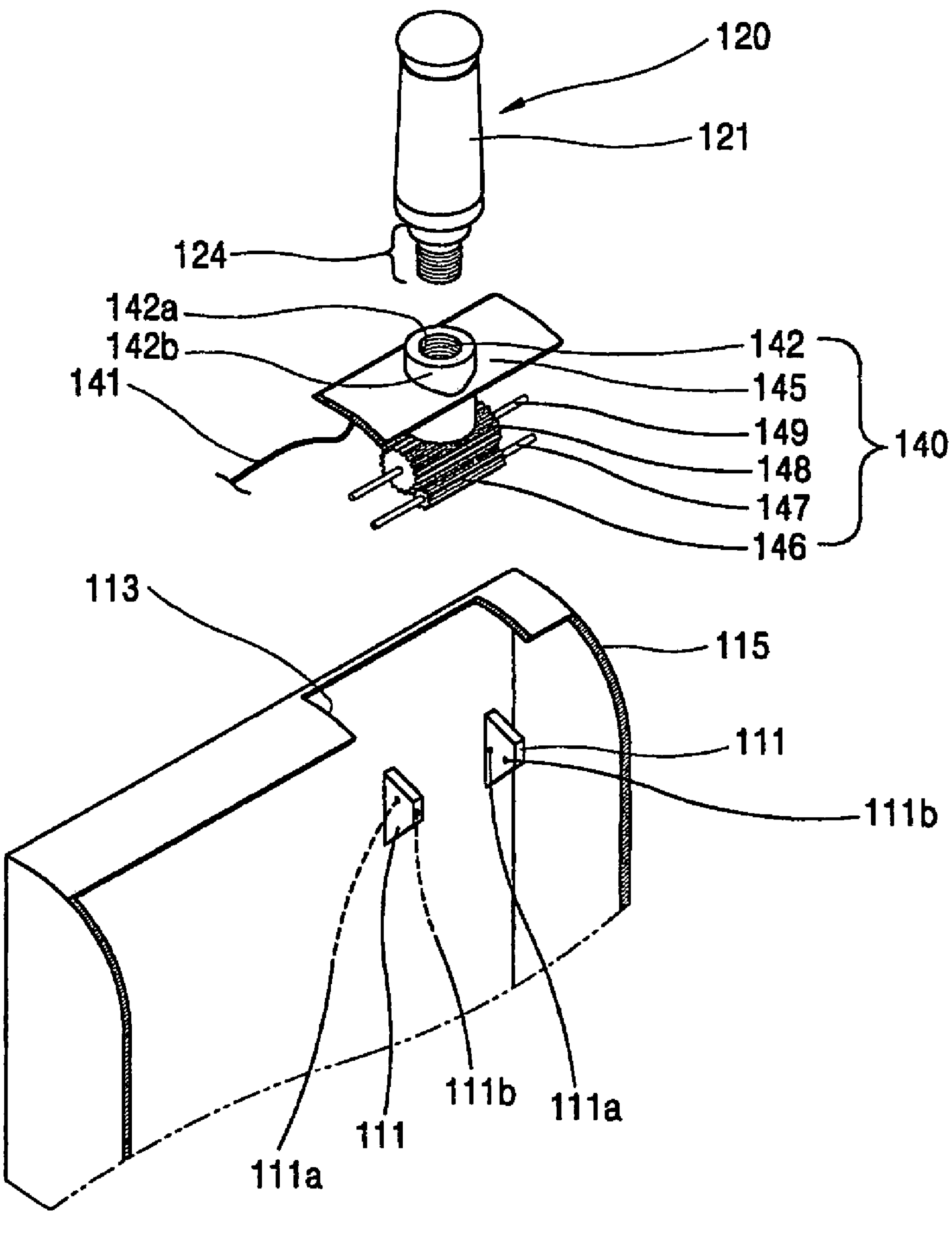
FIG. 4 illustrates a perspective view of a disassembled antenna apparatus of a mobile communication terminal in accordance with an embodiment of the present invention.

Referring to FIG. 4, a perspective view of a disassembled antenna apparatus of a mobile communication terminal, in accordance with an embodiment of the present invention, is shown. The antenna apparatus comprises an antenna 120 and a mechanism 140 for varying the angle of the antenna 120 with respect to the mobile communication terminal. The antenna 120 is preferably a helical antenna and includes a hollow cylindrical antenna body 121 and a fitting unit 124 for connection to the mobile communication terminal, wherein the unit 124 is provided with a screw. Preferably, a helical antenna is used without the addition of a whip antenna because excellent radio frequency transmission/reception sensitivity can be obtained and construction of the terminal may be simplified. However, a combination of helical and whip antennas may be used in alternative embodiments.

An antenna signal line 141 for transmitting a radio signal received from the helical antenna 120 to the components in the terminal body 110 is provided. A bushing 142 is provided in a first end of a bushing case 142*b*, wherein the fitting unit 124 of the helical antenna 120 engages the bushing 142 through the aperture 142*a*. A cover 145 for preventing the introduction of foreign materials into the mobile communication terminal and into the mechanism 140 is formed at a lateral surface of an outer circumference of the bushing case 142*b*. The second end of the bushing case 142*b* is coupled to a surface of the antenna gear 148 so that the helical antenna 120 is fixed with respect to the antenna gear 148. Preferably, the antenna signal line 141 comprises a coaxial cable and is coupled to a lower end portion of the cover 145, and more specifically, to a lower end portion of the bushing case 142*b*.

As shown in FIG. 4, the antenna gear 148 and a connection gear 146 both feature shafts 149 and 147, respectively. The antenna gear shaft 149 and the connection gear shaft 147 are respectively inserted into a pair of first grooves 111*a* and a pair of second grooves 111*b*, respectively, formed at a pair of housings 111. The antenna gear 148 is operatively coupled to the connection gear 146 so that rotation of the antenna gear 148 in a direction results in the rotation of the connection gear 146 in the opposite direction.

Preferably, the bushing case 142*b* is partially exposed through an opening 113 formed at an upper surface of a rear casing 115, wherein the cover 145 preferably covers opening 113. Interference between the bushing case 142*b* or the cover 145 and the connection gear 146 may be generated since the bushing case 142*b* is formed at one surface of the antenna gear 148. To prevent this interference, the antenna gear shaft 149 is preferably formed to be relatively long, and the bushing case 142*b* and the cover 145 protrude from the antenna gear shaft 149.

Figure 5:
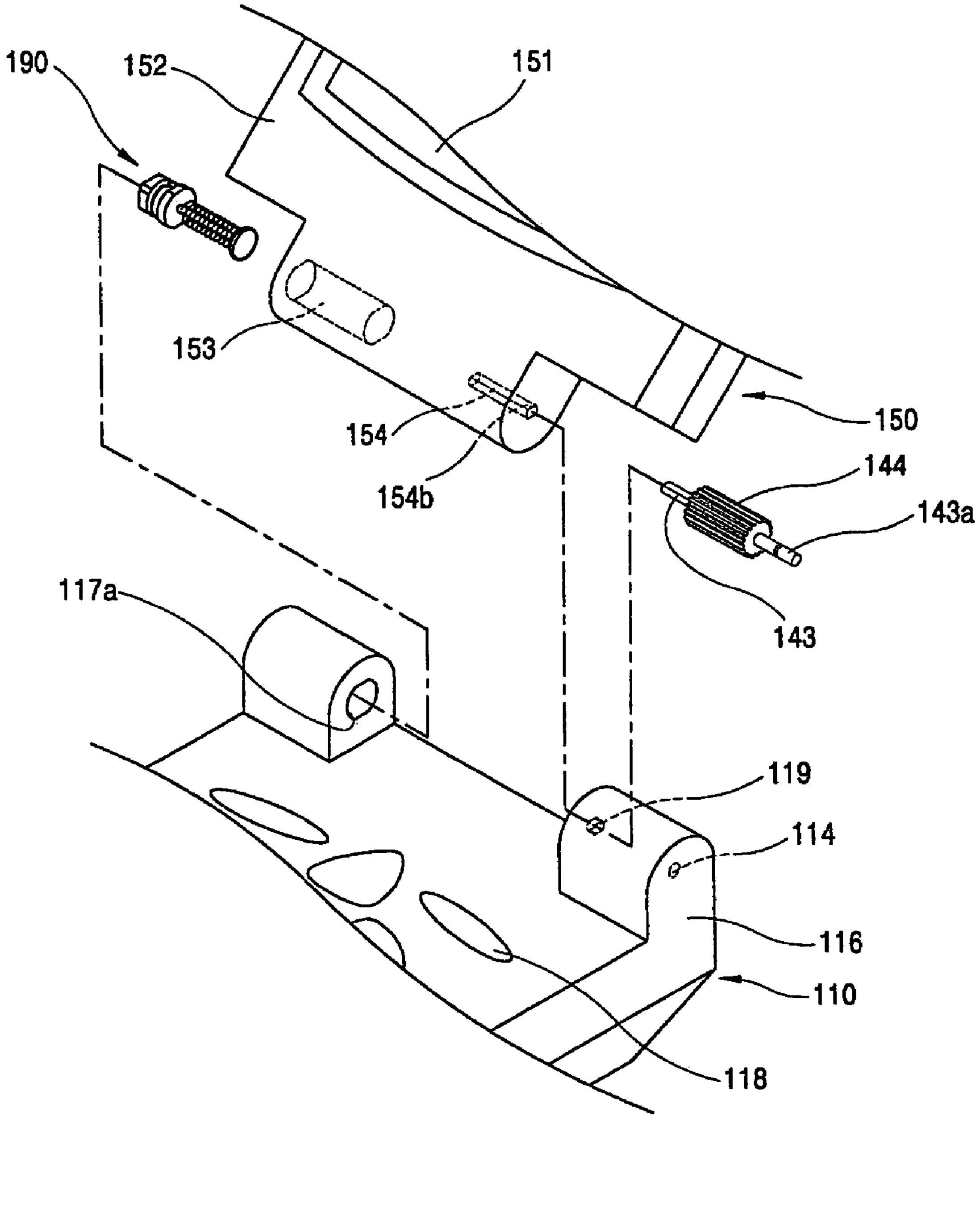
FIG. 5 illustrates a perspective view a disassembled structure of a hinge gear engaged with a connection gear of FIG. 4.

Referring to FIG. 5, a hinge device 190 allows a first folding body 150 to open and close when rotated with respect to a second folding body 110. A hinge device mounting groove 153 receives a first end the hinge device 190. Preferably, a pair of hinge units 116 is formed on the second folding body 110, on opposing lateral sides along the upper surface of the body 110. The combined length of the pair of hinge units 116 and a first folding body hinge unit 151 is preferably approximate to the overall width of the terminal. Alternatively, a single hinge unit 116 may be formed on the second folding body 110, wherein the combined length of the single hinge unit 116 and the first folding body hinge unit 151 is approximate to the overall width of the terminal. Additionally, a groove 117*a* is formed on an inner surface of a first hinge unit 116 and receives a second end of the hinge device 190. A plurality of terminal manipulation devices 118 is disposed on the second folding body 110.

Also in FIG. 5, a hinge gear 144 is fixedly connected to a second folding body 110 to operate according to a rotation of the first folding body 150 with respect to the second folding body 110 of the mobile communication terminal. The hinge gear 144 is formed on a hinge gear shaft 143, of which one end is inserted into an insertion groove 154 formed on the first folding body hinge unit 151. The hinge gear shaft 144 is preferably housed in a second hinge unit 116 so that the end of the hinge gear shaft 143, which is inserted into groove 154, travels through an aperture 119 formed on an inner surface of the unit 116. Another end of the hinge gear shaft 143, preferably the outer end, is inserted into a mounting groove 114 formed in the second hinge unit 116, preferably on an outer surface of the unit 116.

Figure 6:
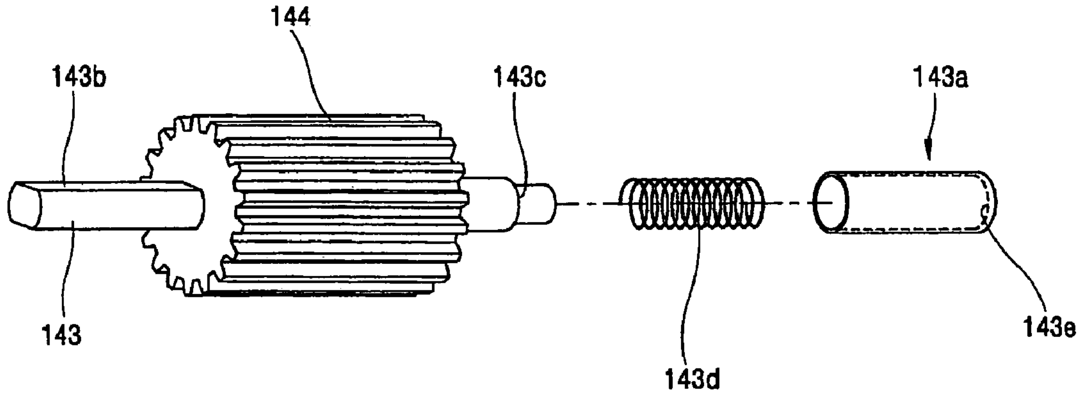
FIG. 6 illustrates a perspective view of a disassembled hinge gear of FIG. 5.

In FIG. 6, the hinge gear 144 is fixed to the middle portion of the hinge gear shaft 143, and an outer circumferential surface of one end of the hinge gear shaft 143 has a prescribed flat surface 143*b*. Therefore, the flat surface 143*b* is fixedly engaged with a flat surface (154*b*) of the insertion groove 154, so that the hinge gear 144 is rotated when the first folding body 150 is rotated with respect to a second folding body 110 (or vice versa). The aperture 119 formed on the inner surface of the unit 116 is preferably comprises a circular shape having a diameter greater than the diameter of the hinge gear shaft 143 in order allow the hinge gear shaft 143 to smoothly rotate.

Furthermore, since the length of the hinge gear shaft 143 is greater than the distance between the aperture 119 and the mounting groove 114, an additional device is required in order to insert the outer end of the hinge gear shaft 143 into the mounting groove 114. That is, as shown in FIG. 7, a detachable shaft cover 143*a*, which houses a spring 143*d* is coupled to an end portion 143*c* of the hinge gear shaft 143, wherein the end portion 143*c* is inserted into the spring 143*d* and the interior 143*e* of the shaft cover 143*a*.

Accordingly, the outer end of the hinge gear 143 may be reduced by compressing the spring 143*d*, so that the hinge gear shaft 143 can be effectively inserted between the aperture 119 and the mounting groove 114. After the insertion the hinge gear shaft 143, the elastic restoring force of the spring 143*d* applies the outer end of the hinge gear shaft so that the hinge gear shaft 143 is effectively fixed to the second folding body hinge unit 116.

The connection gear 146 is preferably operatively coupled to the hinge gear 144 so that rotation of the first folding body 150 with respect to a second folding body 110 (i.e., folding and unfolding of the folding type mobile communication terminal) results in rotation of the connection gear 146. Accordingly, the rotative force due to the folding and unfolding of the folding type mobile communication terminal is transmitted to the antenna gear 148, wherein the helical antenna 120 consequently moves throughout an angle corresponding to the degree the terminal is unfolded.

Since a movement angle of the helical antenna 120 is preferably much less than an open/close angle resulting from the rotation of the first folding body 150 with respect to a second folding body 110, a diameter of the antenna gear 148 is preferably greater than a diameter of the hinge gear 144. Furthermore, since the connection gear 146 participates in the "opening" of the terminal and transmits a rotation motion to the antenna gear 148, a size thereof is preferably formed to be relatively smaller than the hinge and antenna gears 144 and 148, respectively.

An exemplary process of the operation of the antenna apparatus of a mobile communication terminal, in accordance with a preferred embodiment of the present invention, will be described as follows.

The completed antenna 120 is perpendicularly protruded (i.e., extending upwardly) from the upper surface of the second folding body 110 in a "closed" state (i.e., when the first and second folding bodies 150 and 110 are adjacent). When the first folding body 150 is open (i.e., rotated with respect to the second folding body 110), the hinge gear 144 is correspondingly rotated. According to the rotation of the hinge gear 144, the connection gear 146, which is engaged with the hinge gear 144, is rotated in the opposite direction to the rotation direction of the hinge gear 144. Therefore, according to the rotation of the connection gear 146, the antenna gear 148, which is engaged with the connection gear 146, is rotated in the same direction as the hinge gear 144.

Figure 7A:
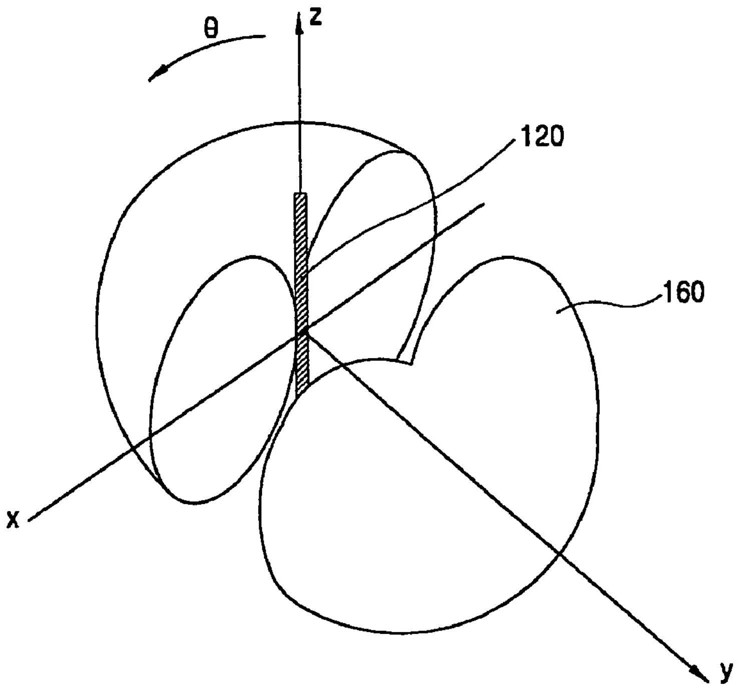
FIGS. 7A and 7B illustrate emission patterns of an antenna apparatus in accordance with an embodiment of the present invention.
Figure 7B:
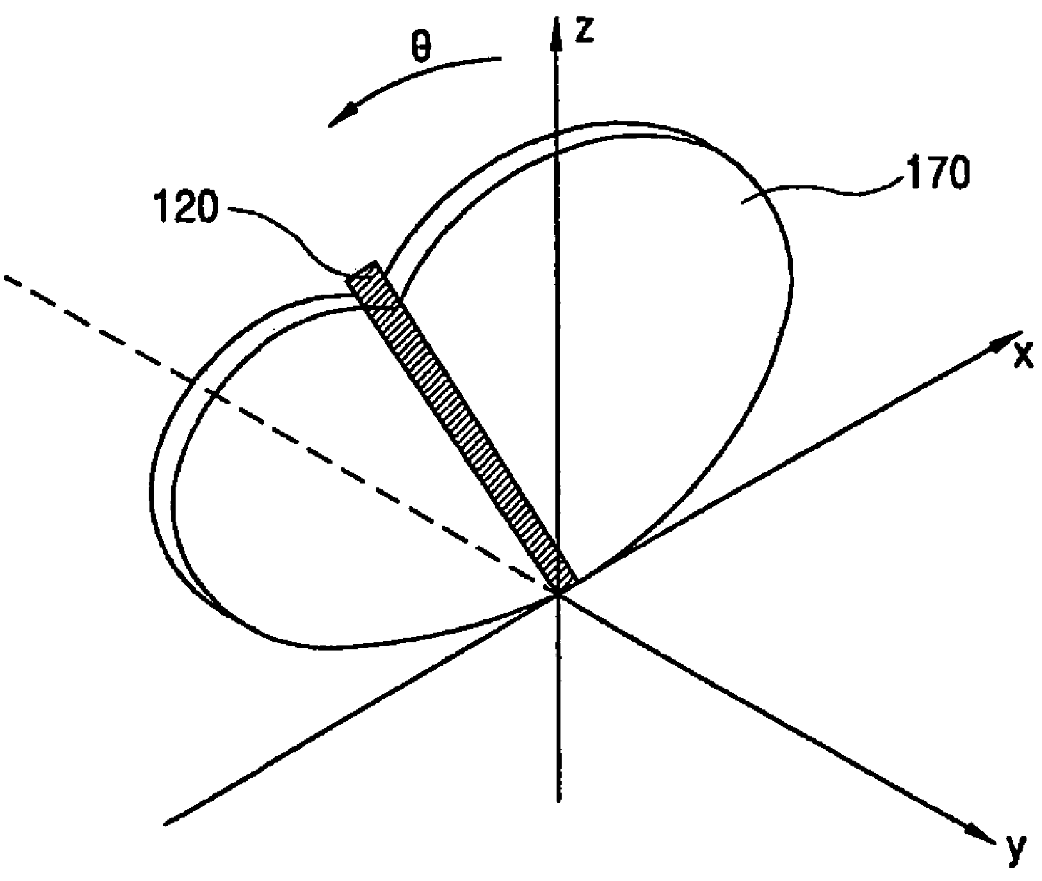

As the mobile communication terminal is "opened", the antenna 120 is inclined with respect to the second folding body 110. Generally, electromagnetic waves generated from an antenna apparatus are emitted to the maximum extent in a perpendicular direction to the antenna apparatus. The movement of the antenna 120 is illustrated in FIGS. 7A and 7B as a rotation along the curved arrow, wherein the angle of rotation along the y-axis is denoted by the angle θ. In FIG. 7A, when the antenna 120 is vertically fixed to the upper surface of the second folding body 110 (i.e., no rotation), the electromagnetic wave emission pattern 160 is shown to be perpendicular to the antenna 120, which also forms the z-axis. The user's head would be situated perpendicular to the y-axis and facing in the direction of the x-axis.

During maximum power transmission (i.e., when a call is being placed), the antenna 120 is inclined an angle θ as shown in FIG. 7B, thereby directing the antenna 120 away from the second folding body 110 and away from the user's head. When the antenna 120 is directed away from second folding body 110, an emission pattern 170 is formed, wherein the proximity the radiation to the user's head is reduced. Therefore, the present invention allows a user to redirect the transmission of electromagnetic radiation away from his person and thereby reduce exposure.

It will be apparent to those skilled in the art that various modifications and variations can be made in the present invention without departing from the spirit or scope of the invention. Therefore, the foregoing description of these embodiments of the present invention has been presented for the purposes of illustration and description. It is not intended to be exhaustive or to limit the invention to the precise form disclosed. Thus, it is intended that the present invention cover the modifications and variations of this invention provided they come within the scope of the appended claims and their equivalents. Preferred embodiments were shown in the context of folding type mobile communication terminals. In alternative embodiments, bar, "slider" type and PDA type terminals can be substituted for the present invention.

What is claimed is:

1. A mobile communication terminal comprising:

a first folding body rotatively connected to a second folding body via a hinge;

an antenna removably fixed to the first folding body; and a mechanism for varying an angle between the antenna and the first folding body, wherein the angle between the antenna and the first folding body corresponds to an angle of rotation by the first folding body with respect to the second folding body, wherein the mechanism comprises:

a hinge gear disposed in the hinge, wherein rotation of the first folding body with respect to the second folding body results in rotation of the hinge gear;

a connection gear in operational relationship with the hinge gear so that rotation of the hinge gear in a direction results in rotation of the connection in the opposite direction;

an antenna gear operatively in operational relationship with the connection gear so that rotation of the hinge gear in a direction results in rotation of the connection in the opposite direction; and an antenna fixing unit fixed to the antenna gear so that rotation of the antenna gear results in rotation of the antenna fixing unit through a predetermined angle.

2. The terminal of claim 1, wherein the antenna fixing unit comprises:

a cover; and a bushing case disposed on the cover, wherein the bushing case fixedly engages the antenna.

3. The terminal of claim 2, further comprising an antenna signal line for transmitting wireless signals received from the antenna to a printed circuit board installed in the terminal, wherein the antenna signal line is formed at a lower end portion of the bushing case.

4. The terminal of claim 3, wherein the antenna signal line comprises a coaxial cable.

5. The terminal of claim 1, wherein a diameter of the antenna gear is greater than a diameter of the hinge gear.

6. The terminal of claim 1, wherein the angle between the antenna and the first folding body is approximately 180° when the angle of rotation by the first folding body with respect to the second folding body is approximately 0°.

7. The terminal of claim 1, wherein the angle between the antenna and the first folding body is minimized when the angle of rotation by the first folding body with respect to the second folding body is maximized.

8. The terminal of claim 1, wherein the antenna comprises a helical antenna.

9. The terminal of claim 1, wherein the mechanism is installed at the hinge.

10. The terminal of claim 1, wherein exposure to a terminal user of electromagnetic radiation emitted from the antenna, when the an angle of rotation by the first folding body with respect to the second folding body is maximized, is less than exposure to electromagnetic radiation emitted from the antenna when the an angle of rotation by the first folding body with respect to the second folding body is minimized.

* * * * *